United States Patent [19]
Moore

[11] Patent Number: 5,240,490
[45] Date of Patent: Aug. 31, 1993

[54] NON-DESTRUCTIVE RECOVERY OF NATURAL NITROGEN PRODUCTS

[75] Inventor: William P. Moore, Hopewell, Va.

[73] Assignee: Harmony Products Inc., Chesapeake, Va.

[21] Appl. No.: 851,063

[22] Filed: Mar. 13, 1992

[51] Int. Cl.$^5$ .......................... C05F 1/00; C05C 9/00; C05G 1/00; C05G 5/00

[52] U.S. Cl. ............................................. 71/17; 71/18; 71/19; 71/20; 71/21; 71/23; 71/28; 71/63; 71/64.05; 426/285; 426/453; 426/644; 426/647; 426/807

[58] Field of Search ............... 71/1, 11, 12, 15, 17-23, 71/64.05, 64.13, 28-30, 63; 426/285, 453, 628, 630, 641, 647, 656, 657, 807

[56] References Cited

U.S. PATENT DOCUMENTS 4,997,469  3/1991  Moore ...................................... 71/11
5,021,077  6/1991  Moore ...................................... 71/17
5,021,247  6/1991  Moore ...................................... 426/69

Primary Examiner—Ferris Lander

[57] ABSTRACT

A continuous process for the non-destructive recovery of natural nitrogenous materials as highly available particulate agricultural nutrients, employing natural materials such as poultry waste, waste water treatment sludge, alfalfa meal, hatchery waste, feathermeal, corn gluten meal and bloodmeal in a fluid bed reactor-granulator where basic natural materials are acidified to pHs of 3.0 to 6.5 and formed into hardened particulates during a retention time between 4 and 20 minutes at a temperature between 70° and 120° C. and discharged free of caramelization before nitrogen losses from decomposition amounts to 0.5 percent of the natural nitrogenous materials. The continuous process provides a new natural nitrogenous particulate agricultural nutrient composition free of caramelization.

15 Claims, No Drawings

NON-DESTRUCTIVE RECOVERY OF NATURAL NITROGEN PRODUCTS

FIELD OF INVENTION

This invention is directed to the recovery of nitrogen from natural materials for use as improved agricultural nutrient substances, and more particularly to a new continuous process whereby these improved substances may be recovered without nitrogen loss or the degradation of the natural materials.

BACKGROUND OF THE INVENTION

The art has recently taken strong interests in the use of natural nitrogenous materials as agricultural nutrient substances and some of these substances are now being commercially produced as fertilizers and animal feed supplements with varying degrees of effectiveness.

My U.S. Pat. Nos. 4,997,469, 5,021,077 and 5,021,247 disclose methods of preparing high integrity natural nitrogenous granules for agriculture by heating natural nitrogenous materials under alkaline conditions until the materials develop adhesive properties, forming the materials into granules by mechanical means and heating the granules until they harden.

Although the foregoing disclosures represented economical steps forward in the utilization of natural nitrogen products, they employed time consuming batch processes and did not recognize the need to quickly treat and recover the natural nitrogenous materials before degradation of these materials occurs causing undesirable nitrogen losses by ammonia vaporization, and caramelization of the natural nitrogenous materials with accompanying loss in nitrogen quality and availability.

No teachings or suggestions have been provided in the prior art of a continuous process for the recovery of natural nitrogenous materials as improved agricultural nutrient substances without caramelization of the natural materials or loss of ammonia nitrogen from the material.

Terms used herein are defined in the following list:

1. Natural nitrogenous materials—any substance occurring in nature formed by living organisms and containing nitrogen, including food processing by-products and wastes, usually in the form of protein or complex organic nitrogen compounds such as uric acid.
2. High integrity—high degree of physical soundness, strength, and resistance to attrition.
3. Adhesive property—the capability of bonding surfaces together by surface attachment.
4. Water soluble nitrogen—soluble in water as defined by the Association of American Plant Food Control Officials (AAPFCO).
5. Harden—to make not soft but solid, firm to touch, and resistant to attrition.
6. Chopper—device for cutting into small pieces by hitting with sharp knives or bars.
7. Percent—weight percent.
8. Base—class of compounds producing pH's between 7 and 14 and having the ability to neutralize acids.
9. Agricultural Nutrient Substances—synthetic or natural materials normally used in the field of agriculture, such as plant nutrients or animal feeds and feed supplements.
10. Caramelization—browning reaction. This reaction is a complicated, non-enzymatic sequence of chemical changes during the exposure to heat of foods containing carbohydrates and proteins. It begins with an aldol condensation of these compounds and ends with the formation of furfural. These changes undesirably affect nutritive value, texture, palatability, and color of food.
11. Non-destructive—the basic chemical structure of treated proteins and carbohydrates remains unchanged. Caramelization has not occurred.

OBJECTS OF THE INVENTION

It is a primary object of the present invention to provide a continuous process for non-destructively recovering agricultural nutrient substances from natural nitrogenous materials under conditions which eliminate caramelization of the natural materials, and reduces ammonia loss during the process to inconsequential levels.

It is another object to provide a continuous process for producing controlled release nitrogen fertilizers from natural nitrogen materials.

It is another object to provide a new agricultural nutrient substance composition which exhibits improved availability of the contained nitrogen for agricultural uses.

It is another object to provide a new granular nitrogen fertilizer composition which releases its nitrogen with improved control and safety.

SUMMARY OF THE INVENTION

The present invention is directed to a continuous process for the non-destructive recovery of natural nitrogenous materials as particulate agricultural nutrients free of caramelization. It was discovered that these valuable materials could be recovered free of caramelization when the nitrogen losses from the decomposition of the natural nitrogenous materials amounted to less than 0.5 percent of these materials in a continuous process.

For the process to achieve the less than 0.5 percent nitrogen decomposition necessary to preclude caramelization, it is necessary to continuously charge basic natural nitrogenous materials with pHs between 7.5 and 14 and containing between 15 and 60 percent moisture and between 1 and 14 percent nitrogen, to a continuous fluid bed reactor-granulator operating at a temperature between 70° and 120° C. and a pressure of about 1 atmosphere. It is necessary to continuously charge acid to the fluid bed reactor-granulator to acidify the natural materials to a pH between 3.0 and 6.5.

Although the natural nitrogenous material is acidified, it is necessary to regulate carefully the total material retention time in the continuous fluid bed reactor-granulator to between 4 and 20 minutes to allow evaporation of contained water, to provide a moisture level of between 2 and 25 percent, and to provide time for the heat to harden the natural materials to particulate agricultural nutrients.

The regulation of the acidity, retention time, and temperature is necessary so that the particulate nutrients can be continuously discharged before nitrogen losses from decomposition of the natural nitrogenous materials amount to 0.5 percent of these materials, and the continuously discharged particulate agricultural nutrients are free of caramelization, which decreases the availability of the natural nitrogenous materials as agricultural nutrients.

Surprisingly, it was found that a new agricultural nutrient, free of caramelization, providing safe and controlled release of contained nitrogen as a plant food or a ruminant feed, was derived from natural nitrogenous materials by the new continuous process.

DESCRIPTION OF PRESENTLY PREFERRED EMBODIMENTS

The process of the present invention produces particulate agricultural nutrients which are particularly effective in their release of nitrogen because the natural nitrogenous materials are recovered in dry particulate form before caramelization of the natural material occurs. The degradation of natural nitrogenous materials to ammonical nitrogen is indicative of caramelization, and I have found that this degradation and caramelization may be prevented when the natural nitrogenous materials are recovered as highly available agricultural nutrients by a continuous process wherein natural nitrogenous starting materials are basic, or made basic, at pHs between 7.5 and 14. If the pH of the natural material is not basic, formation of hardened particulates is not possible in the time and temperature constraints required to prevent caramelization. It is necessary that the natural materials charged to the process contain the appreciable moisture levels between 15 and 60 percent to allow formation of hardened particulates, but higher moisture levels caused the reaction mass to stick to the surfaces in the continuous reactor-granulator and not form satisfactory particulates. To achieve the desired partial hydrolysis of natural nitrogenous materials to more available forms without nitrogen loss and product caramelization, it was found to be critical that the temperature of the materials in the continuous reactor-granulator be maintained between 70° and 120° C. Temperatures outside that range caused reduced nutrient availability because of little hydrolysis at the lower temperatures and excessive ammonia loss and product caramelization at the higher temperatures. To make the continuous operation effective, it was necessary to operate the fluid bed reactor-granulator at about atmospheric pressure.

It was found to be critical in the instant process that the natural materials be acidified to a pH between 3.0 and 6.5 before it leaves the fluid bed reactor-granulator by continuously charging aqueous acid to the fluid bed reactor-granulator. Lower pHs increase caramelization and higher pHs produce softer than desirable particulates.

Satisfactory non-destructive recovery of the natural nitrogenous materials as highly available particulate agricultural nutrients is obtained when retention time in the continuous fluid bed reactor-granulator is carefully controlled to between 4 and 20 minutes, providing for the reduction of moisture to between 2 and 25 percent and the formation of hardened particulate agricultural nutrients.

With the natural nitrogenous materials treated under the conditions defined above, it is possible to continuously discharge particulate nutrients free of caramelization before nitrogen losses caused by the decomposition amounted to 0.5 percent of the natural nitrogenous materials. If the operations were outside of the discovered process, either the ammonical nitrogen losses from decomposition were higher than 0.5 percent and caramelization occurred, or the mixture remained sticky and would not form particulate agricultural nutrients.

Many of the natural nitrogenous materials available as natural products or by-products may be non-destructively recovered in the instant process, including: poultry waste, waste water treatment sludge, alfalfa meal, hatchery waste, feathermeal, corn gluten meal and bloodmeal.

Some of the natural nitrogenous materials such as poultry waste already have sufficient basicity so that its pH is in the required 7.5 to 14.0 range, but some materials are not basic. These materials, such as feathermeal, may be made sufficiently basic by admixing an aqueous strong base with the nitrogenous material before it is acidified in the process. The aqueous bases found most useful were: sodium hydroxide, potassium hydroxide, calcium hydroxide, magnesium hydroxide, ammonium hydroxide, and sodium carbonate. Weak bases such as calcium carbonate were not suitable.

Weak acids such as boric acid were not effective for acidifying the mixture in the reactor-granulator but strong aqueous acids were, including: sulfuric, nitric, phosphoric, formic, acetic, propionic and polyphosphoric acids.

A variety of natural nitrogenous materials may be used in the instant invention so long as they fit the requirements defined above. The uniformity and hardness of the particulates produced are improved where the nitrogenous materials are fine and are comprised of more than 90 percent of particles finer than 0.5 centimeter in diameter, and contain between 10 and 20 percent moisture.

Particulate nutrients were produced in economical and useful forms when the natural nitrogenous materials used in the process contained between 2.0 and 13 percent nitrogen, the concentrations typically found naturally in poultry broiler litter and poultry feathermeal.

When the natural materials used were not naturally basic in character, excellent non-destructive recoveries of these materials were obtained by admixing strong base with the natural materials to provide a pH between 9 and 12. It was found that the base addition could be made before the natural material was charged to the continuous reactor-granulator, or in the reactor-granulator itself before acidifying.

The process of this invention may be carried out in a fluid bed reactor-granulator which provides the necessary mixing, fluidization, and reaction conditions, and minimizes back mixing of the materials passing through.

A practical and most effective reactor-granulator used to carry out the instant process is a fluid bed reactor-granulator comprising a horizontal mixing cylinder, containing one or more mixing elements mounted on a central rotating shaft, which throws the natural nitrogenous materials toward the center of the cylinder thereby creating a mechanically fluidized bed which homogeneously blends the base mixture with acid, the cylinder being equipped with a dam at the discharge port to control the level of materials retained, and one or more chopper blades mounted on the side wall of the cylinder and operating perpendicular to the mixing elements to break any lumps in the mixture.

Best recoveries of evenly sizes, hardened particulates free of caramelization were obtained when the reactor-granulator was operated at temperatures between 70° and 95° C. The temperature could be achieved by using a steam or oil jacketed reactor-granulator, by direct steam injection, and by preheating the natural nitrogenous materials to temperatures lower than required to cause caramelization.

To obtain the most economical use of the reactor-granulator, it is necessary to control the level of materials therein to between 10 and 50 percent of the total volume of the reactor-granulator. Levels lower than 10 percents provide poor heat transfer and uneconomical use of the equipment while levels appreciably higher than 50 percent preclude good fluidization and particulate formation.

Preferred retention time in the continuous reactor-granulator is between 6 and 12 minutes to produce optimum particulates without nitrogen loss and product caramelization.

Optimum operation is required so that product particles are discharged from the fluid bed reactor-granulator before 0.1 percent ammonia nitrogen has been lost from the natural nitrogenous starting materials and the optimum product is recovered free of caramelization.

It was found to be possible to combine synthetic materials, which are useful in agriculture and do not adversely affect operation of the process, with natural materials and recover them as useful agricultural nutrients by this continuous process. Synthetic materials effectively used in the instant process and which do not adversely affect the operation of the continuous process are urea, urea-formaldehyde concentrate, saltpeters, ammonium sulfate, ammonium nitrate, ammonium polyphosphate, potassium phosphate and potassium sulfate. It was found possible to include non-nitrogenous natural materials with the natural nitrogenous materials in the continuous process for recovering agricultural nutrients free of caramelization. Non-nitrogenous natural materials effectively used are phosphate rock, potassium magnesium sulfate, sunflower seed ash, sylvite, clay and silica.

It was discovered that bases and acids could be mixed with the natural nitrogenous materials in amounts necessary to generate exothermic heat of reaction sufficient to heat the materials from ambient temperature to the required reactor-granulator temperature between 70° and 95° C.

The agricultural nutrient composition generated by the instant process is new. For the first time, a dry, particulate natural nitrogenous agricultural nutrient product free of caramelization is available to provide safe and controlled release of contained nitrogen as a plant food and a ruminant feed. It may be produced only with close adherence to the process and its required operating conditions.

A particularly effective and practical aspect of this invention is a process for the non-destructive recovery of natural nitrogenous materials as granular fertilizers which have the desirable properties of controlled release of nitrogen in soils and high physical integrity of the granules.

In this particular process, alkali metal hydroxide is admixed with natural nitrogenous materials, 90 percent of which are smaller in size than 4 U.S. Mesh, and contain between 12 and 18 percent moisture and between 2.5 and 13 percent nitrogen, so that the mixture reaches a pH between 9 and 11. The nitrogenous materials used to produce the granular fertilizer may be poultry waste, waste water treatment sludge, hatchery waste, abatoir waste, feathermeal, bloodmeal, corn gluten meal, or mixtures of these materials.

The base-mixed nitrogenous materials and a stream of strong aqueous mineral acid are continuously fed to one end of a horizontal stationary reactor-granulator cylinder containing one or more mixing plows mounted on a central rotating shaft which throws the nitrogenous material toward the center of the cylinder creating a mechanically fluidized bed and forcing axial and radial flows simultaneously on the materials therein forming and hardening granules. The reactor-granulator cylinder is also equipped with one or more chopper blades mounted on the side wall of the cylinder. These blades operate perpendicularly to the mixing plows to break any lumps in the mixture and to control granule particle size so that a minimum of 50 percent of the particles are in the size range between 4 and 30 U.S. Mesh. The reactor-granulator cylinder is also equipped with a dam at the discharge port located at the end of the cylinder most distant from the charging end to control the level of material retained in the cylinder to between 10 and 35 percent of the total cylinder volume.

For best preparation of the granular fertilizer, the horizontal reactor-granulator is continuously operated at a temperature between 75° and 85° C. so that the nitrogenous materials react with the alkali metal hydroxide base to develop adhesive properties and is then acidified by the aforementioned aqueous mineral acid in the fluid bed. This reaction generates the heat necessary to evaporate moisture and to harden the natural nitrogenous materials in granules which are continuously discharged free of caramelization after a retention time between 6 and 12 minutes in the reactor-granulator and before 0.1 percent ammonia nitrogen has been lost by degradation from the granules.

The hardened granules continuously discharged contain between 1 and 10 percent moisture and are slightly acid. A 10 percent aqueous mixture of the granules shows a pH between 4 and 6.5.

The controlled release granular nitrogen fertilizer produced by the above specifically described process is new. For the first time such a fertilizer composition free of caramelization is available for the safe and controlled nitrogen fertilization of nitrogen sensitive plants, where all of the nitrogen is readily available and its release is not impeded by caramelization.

The following examples illustrate the process of the present invention of non-destructive recovery of natural nitrogen for agriculture, and the efficacy of the compositions prepared thereby.

EXAMPLE 1

Example 1 illustrates the continuous process for the non-destructive recovery of the natural nitrogenous material, poultry broiler litter, as highly available particulate agricultural nutrient.

A dry fertilizer premix was prepared from natural nitrogenous materials chicken broiler litter and alfalfa meal admixed with synthetic nitrogen compound urea and natural non-nitrogenous material, sylvite, and stored in a feed hopper with the composition listed as follows:

| Materials | Wt % |
| --- | --- |
| Broiler Litter, 80 dry matter, 2.7-4.5-2.2 | 54.7 |
| Alfalfa Meal, 90 dry matter, 3.2-0.6-3.0 | 23.8 |
| Urea, 46-0-0 | 25.0 |
| Sylvite, 0-0-62 | 8.0 |
| Totals | 100.0 |

Also premixed and stored briefly in a feed tank was the liquid fertilizer ingredient composition listed as follows:

| Materials | Wt % |
|---|---|
| Urea-Formaldehyde Concentrate-85 dry matter | 79 |
| Caustic Soda, 50 dry matter | 21 |
| Totals | 100 |

Mineral acid, sulfuric acid, was stored in another liquid storage tank.

A Littleford KM-300D continuous mixer having a total volume of 300 liters was used as a horizontal mechanically fluidized reactor-granulator containing the requisite mixing elements, chopper blades, and level controlling dam at the product discharge port. The horizontal mixing cylinder was jacketed for high pressure steam heating.

Operations were initiated by screw feeding the dry fertilizer premix from the feed hopper to fill the Littleford KM-300D about 30 percent, and high pressure steam was applied to the jacket to bring the temperature of broiler litter in the KM-300D to 80° C. The dry premix feed rate was set to 15.8 pounds per minute, and the liquid premix addition into the feed end of the KM-300D was commenced using a metering pump at a rate of 5.1 pounds per minute. Then continuous addition of 93 percent aqueous sulfuric acid was started using a metering pump to inject the mineral acid into the mixture halfway between the feed and discharge ends of the horizontal reactor-granulator cylinder at a rate of 0.82 pounds per minute.

The dam at the discharge end of the KM-300D was set to maintain about 100 liters of materials in the cylinder as the materials continuously passed through. The reaction mixture had roughly the density of water so that the retention time of the materials passing through the reactor-granulator was 10 minutes. As the liquid acid and dry materials met and were heated and fluidized mechanically, granules were formed and hardened, temperature increased to 85° C., and the pH of the mixture decreased from 10.1 to 3.5 after the sulfuric acid was added. It remained at that level in the product discharged.

Moisture was removed during the reaction granulation so that the granules discharged contained 9 percent moisture and were free of caramelization. A small airflow through the fluid bed was used during the operation to remove any water vapor and ammonia generated during the operation. An ice cooled condenser was used to recover the water and ammonia from the air effluent which was analyzed for ammonia content. Ammonia nitrogen in the effluent was less than 0.1 percent of the natural nitrogenous material fed to the reactor.

The fertilizer granules recovered were dried to a 2.5 percent moisture in a fluid bed dryer, analyzed and found to have the composition listed as follows:

| Component | Wt % |
|---|---|
| Total Nitrogen, N | 14.7 |
| Cold Water Insoluble Nitrogen, CWIN | 7.7 |
| Hot Water Insoluble Nitrogen, HWIN | 4.2 |
| Phosphate, $P_2O_5$ | 3.1 |
| Potassium, $K_2O$ | 6.2 |

The dry granular fertilizer product was screened and the following particle size distribution was found.

| Screen Size Range | Wt % |
|---|---|
| +6 U.S. Mesh | 6.2 |
| −6 +16 | 39.3 |
| −16 +40 | 44.1 |
| −40 | 10.4 |

EXAMPLE 2

Example 2 illustrates the effectiveness of the non-destructively recovered agricultural nutrients of the instant continuous process by comparison with a product prepared by similar conventional means.

All of the ingredients of Example 1 were mixed in a Pugmill at ambient temperature in the weight ratios employed in Example 1 to form a mud-like mixture. The mixture was dried in a conventional atmospheric pressure drying oven at a temperature of 85° C. until the moisture content was reduced to 9 percent. During the drying process the mixture hardened into a solid block with several cracks occurring because of shrinkage. Ammonia evolved from mixture during drying amounted to 5 percent of the natural nitrogenous materials and the final pH of the mixture was 6.8 compared to 3.5 with the product of the instant invention.

Microscopic inspection of this product showed it to be a cemented, non particulated, dark brown material which was caramelized and clearly degraded, while the same inspection of the product of Example 1 showed that it was composed of individual particulates which were not stuck together in agglomerates, light brown in color, and not caramelized.

The cemented Pugmill product was ground and screened so that sufficient −6+16 mesh material was obtained for analyses. The results obtained follow:

| Component | Wt % |
|---|---|
| Total Nitrogen, N | 12.2 |
| Cold Water Insoluble Nitrogen, CWIN | 7.8 |
| Hot Water Insoluble Nitrogen, HWIN | 7.2 |
| Phosphate, $P_2O_5$ | 3.6 |
| Potassium, $K_2O$ | 6.5 |

The Availability Index of the slow release nitrogen in Example 1 was 45.5 percent compared to only 7.7 percent for the product made by oven drying the Pugmill mixed product.

The effectiveness of the two products as agricultural nutrient fertilizers were compared in field plot tests growing, measuring, and evaluating tall fescue grass treated initially with one application of 1.5 lbs N per 1000 square feet turf area with the two products. Comparisons obtained with the two products and urea after 30, 60, and 90 days are tabulated as follows:

| Materials | Turf Quality Ratings 1-9 max. After | | | |
|---|---|---|---|---|
| | 18 days | 60 days | 90 days | 142 days |
| Example 1 Product | 7.00 | 7.33 | 7.33 | 7.00 |
| Pugmill Product | 6.67 | 6.67 | 5.67 | 5.33 |
| Urea, 46-0-0 granules | 7.00 | 6.67 | 6.00 | 5.67 |

It can be seen that the product of Example 1 out performed the Pugmill product and urea, and that the differences became more apparent as the tests were continued. These results show that the nitrogen in the Example 1 product was non-destructively recovered and that the product recovered was available as an especially effective agricultural nutrient.

I claim:

1. A continuous process for non-destructive recovery of natural nitrogenous materials as highly available particulate agricultural nutrients, comprising:
   (a) continuously charging natural nitrogenous materials, exhibiting pH's between 7.5 and 14 and containing between 15 and 60 percent moisture and between 1 and 14 percent nitrogen, to a continuous fluid bed reactor-granulator, wherein the level of natural materials is controlled to between 10 and 50 percent of the total volume of the fluid bed reactor-granulator, temperature is between 70° and 120° C. and pressure is about 1 atmosphere;
   (b) acidifying the natural materials to a pH between 3.0 and 6.5 by continuously charging acid to the fluid bed reactor-granulator;
   (c) controlling retention time in the continuous fluid bed reactor-granulator to between 4 and 20 minutes to allow for reducing moisture content to between 2 and 25 percent and formation of hardened particulate agricultural nutrients; and
   (d) continuously discharging the particulate nutrients free of caramelization before nitrogen losses from decomposition amount to 0.5 percent of the natural nitrogenous materials.

2. The process of claim 1 wherein the natural nitrogenous materials are selected from the group consisting of poultry waste, waste water treatment sludge, alfalfa meal, hatchery waste, feathermeal, corn gluten meal, and bloodmeal.

3. The process of claim 1 wherein an aqueous strong base selected from the group consisting of sodium hydroxide, potassium hydroxide, calcium hydroxide, magnesium hydroxide, ammonium hydroxide, and sodium carbonate, is admixed with the natural nitrogenous materials before acidifying.

4. The process of claim 1 wherein the strong acid is selected from the group of acids consisting of sulfuric, nitric, phosphoric, formic, acetic, propionic, and polyphosphoric.

5. The process of claim 1 wherein the natural nitrogenous materials comprise particles, more than 90 percent of which are smaller than 0.5 centimeters in diameter, and contain between 10 and 20 percent moisture.

6. The process of claim 1 wherein the natural nitrogenous materials contain between 2.0 and 13 percent nitrogen.

7. The process of claim 1 wherein an admixture of strong base with the natural nitrogenous materials is made to provide a pH between 9 and 12 before acidifying.

8. The process of claim 1 wherein the fluid bed reactor-granulator comprises a horizontal mixing cylinder, containing one or more mixing elements mounted on a central rotating shaft, which throws the natural nitrogenous materials toward the center of the cylinder thereby creating a mechanically fluidized bed which homogeneously blends the base mixture with acid, the cylinder being equipped with a dam at the discharge port to control the level of materials retained, and one or more chopper blades mounted on the side wall of the cylinder and operating perpendicular to the mixing elements to break lumps in the mixture.

9. The process of claim 1 wherein the fluid bed reactor-granulator is operated at temperatures between 70° and 95° C.

10. The process of claim 1 wherein the particles are discharged from the fluid bed reactor-granulator after a retention time between 6 and 12 minutes.

11. The process of claim 1 wherein the particles are discharged from the fluid bed reactor-granulator before 0.1 percent ammonia nitrogen has been lost from the natural nitrogenous materials.

12. The process of claim 1 wherein synthetic materials useful in agriculture are admixed with the natural nitrogenous materials, the synthetic materials being selected from the group consisting of urea, urea-formaldehyde concentrate, saltpeter, ammonium sulfate, ammonium nitrate, ammonium polyphosphate, potassium phosphate, and potassium sulfate.

13. The process of claim 1 wherein non-nitrogenous natural materials useful in agriculture are admixed with the natural nitrogenous materials, the admixed materials being selected from the group consisting of phosphate rock, potassium magnesium sulfate, sunflower seed ash, sylvite, clay, and silica.

14. The process of claim 1 wherein bases and acids are admixed with the natural nitrogenous materials in amounts to generate exothermic heat of reaction sufficient to heat the materials from ambient temperature to a temperature between 70° to 95° C.

15. A continuous process for the non-destructive recovery of natural nitrogenous materials as granular fertilizers exhibiting improved controlled release of nitrogen and high physical integrity, comprising:
   (a) admixing sufficient alkali metal hydroxide with the natural nitrogenous materials, 90 percent of which are smaller in size than 4 U.S. Mesh, and contain between 12 and 18 percent moisture and between 2.5 and 13 percent nitrogen, so that the mixture exhibits a pH between 9 and 11, the nitrogenous materials being selected from the group consisting of poultry waste, waste water treatment sludge, hatchery waste, abatoir waste, feathermeal, bloodmeal, and corn gluten meal;
   (b) continuously charging the base admixed nitrogenous materials and a stream of strong aqueous mineral acid to one end of a horizontal stationary reactor-granulator cylinder containing one or more mixing plows mounted on a central rotating shaft which throws the nitrogenous material toward the center of the cylinder creating a mechanically fluidized bed and forcing axial and radial flows simultaneously on the materials therein forming and hardening granules, the reactor-granulator cylinder being equipped with one or more chopper blades mounted on the side wall of the cylinder and operating perpendicularly to the mixing plows to break any lumps in the mixture and control granule particle size so that a minimum of 50 percent of the particles are in the size range between 4 and 30 U.S. Mesh, and the cylinder also being equipped with a dam at the discharge port located at the end of the cylinder most distant from the charging end, to control the level of material retained in the cylinder to between 10 and 35 percent of the total cylinder volume;
   (c) continuously operating the horizontal reactor granulator at a temperature between 75° and 85° C. so that the nitrogenous materials react with the alkali metal hydroxide base to develop adhesive properties and are then acidified by a mineral acid in the fluid bed, generating heat necessary to evaporate moisture and harden the natural nitrogenous materials into granules, which are continuously discharged free of caramelization after a retention time of between 6 and 12 minutes, and before 0.1 percent ammonia nitrogen has been lost by degradation of the nitrogenous materials;

(d) recovering the discharged hardened granules containing between 1 and 10 percent moisture and exhibiting a pH between 4 and 6.5.

* * * * *